US007231460B2

(12) United States Patent
Sullivan et al.

(10) Patent No.: US 7,231,460 B2
(45) Date of Patent: Jun. 12, 2007

(54) SYSTEM AND METHOD FOR LEVERAGING NETWORKED COMPUTERS TO VIEW WINDOWS BASED FILES ON LINUX PLATFORMS

(75) Inventors: Gary E. Sullivan, Trabuco Canyon, CA (US); Mike J. Giffin, Tustin, CA (US); Jeff LaSor, Foothill Ranch, CA (US); Mark D. Goddard, Foothill Ranch, CA (US); Kent M. Bowling, Foothill Ranch, CA (US)

(73) Assignee: Gateway Inc., Irvine, CA (US)

( * ) Notice: Subject to any disclaimer, the term of this patent is extended or adjusted under 35 U.S.C. 154(b) by 812 days.

(21) Appl. No.: 09/874,630

(22) Filed: Jun. 4, 2001

(65) Prior Publication Data

US 2002/0194380 A1 Dec. 19, 2002

(51) Int. Cl.
*G06F 15/16* (2006.01)

(52) U.S. Cl. .................................. 709/246; 207/229
(58) Field of Classification Search ................ 709/219, 709/200, 201, 203, 218, 238, 207, 229, 246; 717/122, 136, 137; 715/514; 707/4
See application file for complete search history.

(56) References Cited

U.S. PATENT DOCUMENTS

| 5,095,866 | A | * | 3/1992 | Burke ................... 123/179.14 |
| 5,201,046 | A | * | 4/1993 | Goldberg et al. ........... 707/100 |
| 5,473,691 | A | * | 12/1995 | Menezes et al. ............ 713/161 |
| 5,615,361 | A | * | 3/1997 | Leung et al. .................. 707/3 |
| 5,621,894 | A | * | 4/1997 | Menezes et al. ............ 709/227 |
| 5,627,997 | A | * | 5/1997 | Pearson et al. ............... 710/65 |
| 5,757,920 | A | * | 5/1998 | Misra et al. ................ 713/158 |
| 5,768,503 | A | * | 6/1998 | Olkin ......................... 713/201 |
| 5,822,750 | A | * | 10/1998 | Jou et al. ....................... 707/2 |
| 5,835,495 | A | * | 11/1998 | Ferriere ...................... 370/465 |
| 5,870,747 | A | * | 2/1999 | Sundaresan ................. 707/101 |
| 5,875,296 | A | * | 2/1999 | Shi et al. .................... 713/202 |
| 5,899,986 | A | * | 5/1999 | Ziauddin ....................... 707/2 |
| 5,905,866 | A | * | 5/1999 | Nakabayashi et al. ...... 709/223 |

(Continued)

OTHER PUBLICATIONS

Railsback, Kevin, *Vmware Runs Windows Under Linix*, InfoWorld, vol. 21, No. 23, p. 43, Jun. 7, 1999.

(Continued)

*Primary Examiner*—Paul H. Kang
(74) *Attorney, Agent, or Firm*—Jeffrey A. Proechl; Woods Fuller Schultz & Smith (57) ABSTRACT

Systems and methods for leveraging resources on a computer network to view a file on a client computer written in a format unreadable by the client computer are provided. According to one method, the client computer receives a file in a source format unreadable by the client computer. The client computer broadcasts the format of the received file to a plurality of File Viewing Servers (FVSs) in the network. In response, the client computer receives from at least one of the FVSs a conversion rating, which indicates the respective FVS's ability to convert the source format of the file into a conversion format readable by the client computer. Upon receiving the conversion ratings from the FVSs, the client computer selects the FVS transmitting the highest conversion rating to convert the received file from the source format unreadable by the client computer into the conversion format readable by the client computer.

44 Claims, 6 Drawing Sheets

U.S. PATENT DOCUMENTS

| | | | | |
|---|---|---|---|---|
| 5,911,776 | A * | 6/1999 | Guck | 709/217 |
| 5,913,061 | A * | 6/1999 | Gupta et al. | 719/310 |
| 5,931,900 | A * | 8/1999 | Notani et al. | 709/201 |
| 5,940,819 | A * | 8/1999 | Beavin et al. | 707/2 |
| 5,949,977 | A | 9/1999 | Hernandez | |
| 5,960,200 | A * | 9/1999 | Eager et al. | 717/147 |
| 5,978,477 | A * | 11/1999 | Hull et al. | 358/403 |
| 5,987,402 | A * | 11/1999 | Murata et al. | 704/2 |
| 5,995,597 | A * | 11/1999 | Woltz et al. | 379/93.24 |
| 6,000,033 | A * | 12/1999 | Kelley et al. | 713/201 |
| 6,003,065 | A * | 12/1999 | Yan et al. | 709/201 |
| 6,006,214 | A * | 12/1999 | Carey et al. | 707/2 |
| 6,021,469 | A * | 2/2000 | Tremblay et al. | 711/125 |
| 6,038,625 | A | 3/2000 | Ogino et al. | |
| 6,065,120 | A * | 5/2000 | Laursen et al. | 713/201 |
| 6,078,924 | A * | 6/2000 | Ainsbury et al. | 707/101 |
| 6,078,926 | A * | 6/2000 | Jensen et al. | 707/103 R |
| 6,088,451 | A * | 7/2000 | He et al. | 713/201 |
| 6,091,412 | A * | 7/2000 | Simonoff et al. | 715/749 |
| 6,128,647 | A | 10/2000 | Haury | |
| 6,247,011 | B1 * | 6/2001 | Jecha et al. | 707/9 |
| 6,249,817 | B1 * | 6/2001 | Nakabayashi et al. | 709/224 |
| 6,272,665 | B1 * | 8/2001 | Johnson et al. | 716/3 |
| 6,330,529 | B1 * | 12/2001 | Ito | 704/3 |
| 6,336,124 | B1 * | 1/2002 | Alam et al. | 715/523 |
| 6,385,314 | B1 * | 5/2002 | Furuya | 379/219 |
| 6,463,404 | B1 * | 10/2002 | Appleby | 704/9 |
| 6,470,394 | B1 * | 10/2002 | Bamforth et al. | 709/241 |
| 6,556,560 | B1 * | 4/2003 | Katseff et al. | 370/352 |
| 6,590,674 | B1 * | 7/2003 | Orton | 359/1.18 |
| 6,665,086 | B2 * | 12/2003 | Hull et al. | 359/1.15 |
| 6,704,118 | B1 * | 3/2004 | Hull et al. | 358/1.15 |
| 6,711,606 | B1 * | 3/2004 | Leymann et al. | 709/203 |
| 6,711,624 | B1 * | 3/2004 | Narurkar et al. | 719/321 |
| 6,789,057 | B1 * | 9/2004 | Morimoto et al. | 704/2 |
| 6,832,380 | B1 * | 12/2004 | Lau et al. | 719/328 |
| 6,862,103 | B1 * | 3/2005 | Miura et al. | 358/1.15 |
| 2001/0034855 | A1 * | 10/2001 | Ando et al. | 714/7 |
| 2001/0044878 | A1 * | 11/2001 | Ando et al. | 711/112 |
| 2002/0156833 | A1 * | 10/2002 | Maurya et al. | 709/203 |
| 2003/0004874 | A1 * | 1/2003 | Ludwig et al. | 705/40 |
| 2003/0041095 | A1 * | 2/2003 | Konda et al. | 709/201 |
| 2003/0126214 | A1 * | 7/2003 | Oliszewski | 709/206 |
| 2003/0220838 | A1 * | 11/2003 | Ishii et al. | 705/14 |
| 2004/0019853 | A1 * | 1/2004 | Takizawa et al. | 715/523 |
| 2004/0122827 | A1 * | 6/2004 | Cazemier | 707/100 |
| 2004/0181783 | A1 * | 9/2004 | Nagata et al. | 717/137 |
| 2005/0088690 | A1 * | 4/2005 | Haneda et al. | 358/1.15 |

OTHER PUBLICATIONS

Huff, Matthew, *Lnux and NT*, UNIX Review's Performance Computing, vol. 17, No. 3, p. 80, 99/03/00.

VM Ware, Inc., *Vmware Virtual Machine Technology*, Sep. 2000.

Tun Plus, 4 page Brochure re Tun v11, Smarterm, undated.

VM Ware, re Windows with Linux, © 2000.

* cited by examiner

SYSTEM AND METHOD FOR LEVERAGING NETWORKED COMPUTERS TO VIEW WINDOWS BASED FILES ON LINUX PLATFORMS

FIELD OF THE INVENTION

The present invention relates generally to networked computing, and more specifically to, leveraging resources on a computer network to view a file on a client computer that is written in a format unreadable by the client computer.

BACKGROUND OF THE INVENTION

Thin client computers have recently gained in popularity for providing web browsing and electronic mail applications to users at low cost. The thin client computers achieve low cost by requiring less processing capabilities and memory space than standard PCs. In addition, the thin client computers are generally easier to maintain than standard PCs.

A popular operating system for managing the operation of thin client computers is a Linux operating system. Linux is popular because it may be obtained with little or no license fee. In addition, Linux is an open source operating system, allowing a programmer to easily configure it for the limited processing capabilities and memory space of many thin client computers.

A drawback of a Linux based computer, however, is that a user on the Linux based computer may have a difficult time viewing a file written in a Windows based format, such as Microsoft Word™. Typically, the user on the Linux based computer has two options for viewing the file. The user may utilize a Linux based conversion utility to convert the file into an HTML file, which can then be viewed on the Linux based computer using a web browser application. However, Linux based conversion utilities generally do a moderately poor job of converting a Windows based file into an HTML file. Alternatively, the user may forward the file to a Windows based computer, and then view the file on the Windows based computer. However, this option may inconvenience the user by requiring the user to physically move to the Windows based computer to view the file.

SUMMARY OF THE INVENTION

Embodiments of the present invention provide a system and a method for leveraging resources on a computer network to view a file on a client computer that is written in a format unreadable by the client computer.

In one aspect of a preferred embodiment, the client computer receives a file in a source format unreadable by the client computer. The client computer broadcasts the format of the received file to a plurality of File Viewing Servers (FVSs) in a computer network. In response, the client computer receives from at least one of the plurality of FVSs a conversion rating, which indicates the respective FVS's ability to convert the source format of the received file unreadable by the client computer into a conversion format readable by the client computer. Upon receiving the conversion ratings from the plurality of FVSs, the client computer selects the FVS transmitting the highest conversion rating.

In another aspect of a preferred embodiment, the client computer stores a lookup table having one or more entries. Each entry includes a file format unreadable by he client computer and a selected one of the plurality of FVSs capable of converting the unreadable file format into a file format readable by the client computer. Upon receiving a file in a source format unreadable by the client computer, the client computer locates the entry in the lookup table corresponding to the source format of the received file. The client computer then selects the FVS specified in the located entry.

In yet another aspect of a preferred embodiment, the computer network further includes a resource locator server. Upon receiving a file in a source format unreadable by the client computer, the client computer transmits the source format of the received file to the resource locator server. In response, the client computer receives a selection of one of the plurality of FVSs from the resource locator server. The selected server has the highest conversion rating corresponding to the source format of the received file.

To convert the source format of the received file into the conversion format, the client computer transmits the file to the selected FVS. The selected FVS uses a native application, i.e. an application residing locally on the selected FVS, to convert the received file written in the source format to the received file written in the conversion format. The selected FVS then transmits the file to the client computer. Upon receiving the file, the client computer displays the file to a user.

In another aspect of a preferred embodiment, the selected FVS stores the received file written in the conversion format on its memory and transmits the location of the stored file to the client computer. The client computer is then able to access the location of the file, and download the file written in the conversion format from the selected FVS onto the client computer.

In yet another aspect of a preferred embodiment, the client computer transmits the received file to the selected FVS. Upon receiving the file, the selected FVS opens the file in a native application, i.e. an application residing locally on the selected FVS, and generates display content information therefrom. The selected FVS transmits the display content information to the client computer, and upon receipt, the client computer displays the display content information to a user.

Other methods, features and advantages of the invention will be or will become apparent to one with skill in the art upon examination of the following figures and detailed description.

BRIEF DESCRIPTION OF THE DRAWINGS

The drawings illustrate the design and utility of preferred embodiments of the present invention, in which similar elements are referred to with common reference numerals.

DETAILED DESCRIPTION OF THE PREFERRED EMBODIMENTS

Figure 1:
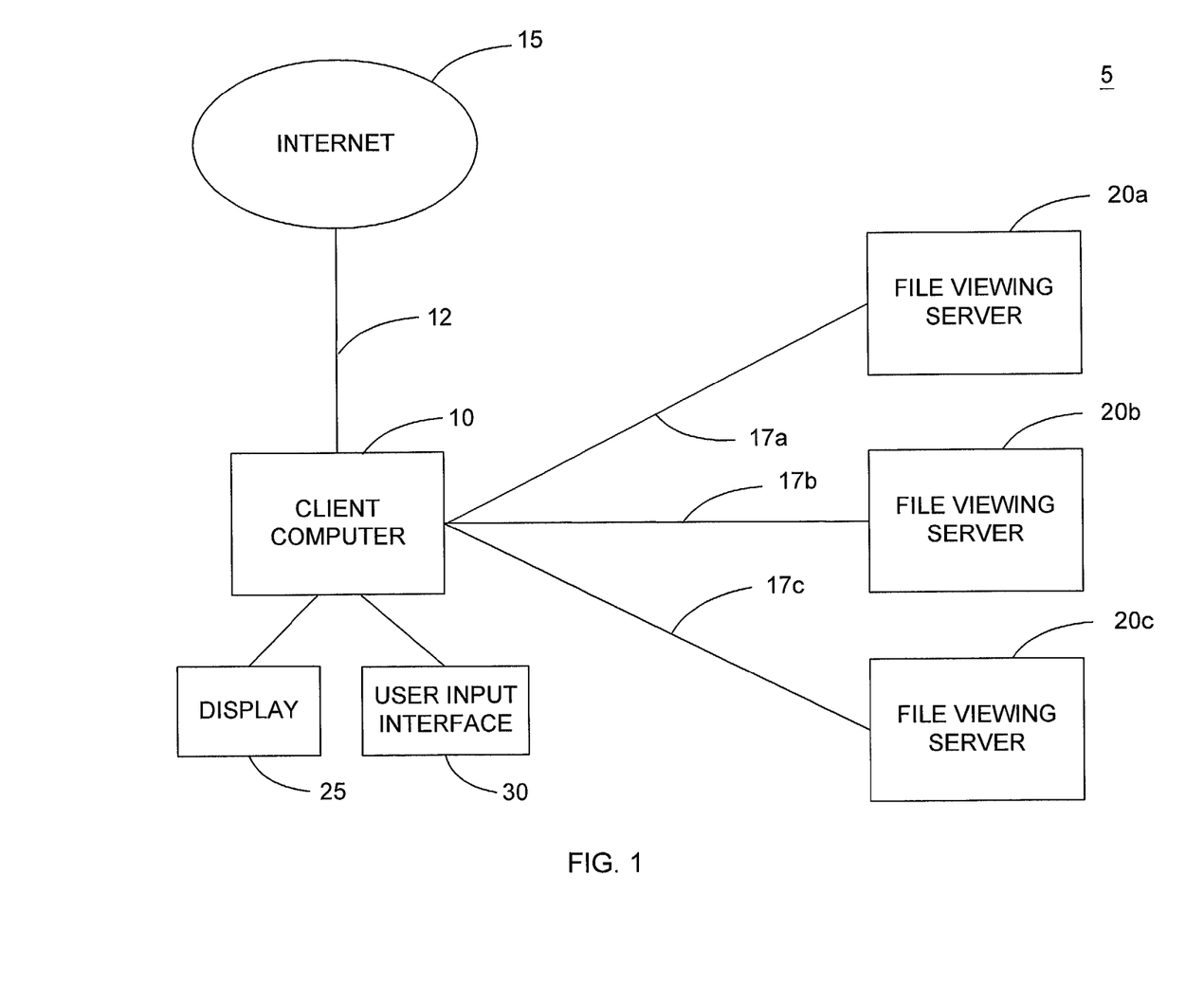
FIG. 1 is a block diagram of an exemplary computer network according to an embodiment of the present invention.

FIG. 1 shows an exemplary computer network 5 according to one embodiment of the present invention. The computer network 5 includes a client computer 10 connectable to the Internet 15, e.g. the World Wide Web, via an Internet link 12, which may include, but is not limited to, an Ethernet link, a dialup link, a cable link, and the like. The computer network 5 further includes a plurality of File Viewing Servers (FVSs) 20a-20c, each FVS 20a-20c being connectable to the client computer 10 via a network connection 17a-17c. Although three FVSs 20a-20c are shown in FIG. 1, those skilled in the art will appreciate that any number of FVSs may be included in the computer network 5.

Each FVS 20a-20c and the client computer 10 may be part of the same local network and may communicate with each other through a local network connection 17a-17c, which may include, but is not limited to, an Ethernet connection, a Home Phone Network Adapter (HPNA) connection, and the like. Alternatively, each FVS 20a-20c may be located on a remote server on the Internet that is connectable to the client computer 10 via an Internet link 17a-17c.

The client computer 10 may be, but is not limited to, a thin client, a desktop computer, a laptop, a Wireless Access Protocol (WAP) mobile phone, a Personal Digital Assistant, or the like. The client computer 10 includes memory (not shown) for storing programs and data, such as RAM, EPROM, Flash memory, a hard drive, and the like. The client computer 10 also includes an operating system stored in memory for managing the operation of the client computer 10. The operating system may be Linux, Microsoft Windows™, Mac OS™, Unix, or any other computer operating system.

The client computer 10 further includes a web browser application stored in memory for downloading web pages onto the client computer 10 from the Internet 15 via an Internet link. The web browser application may be Netscape Navigator, Microsoft Internet Explorer™, an American Online (AOL) web browser, or any other web browser application. The client computer 10 may also include an e-mail application stored in memory for receiving, writing and sending e-mail messages via the Internet link 12. The client computer 10 further includes a file viewing program module, such as a plug-in module, stored in memory for enabling the client computer 10 to display a file from a web page or an e-mail attachment that is written in a format unreadable by the client computer 10. To accomplish this, the file viewing program module utilizes resources on one of the plurality of FVSs 20a-20c to convert the format of the file into another format readable by the client computer 10. The file viewing program module includes any combination of software-based modules and/or hardware-based modules that may perform the functions described herein.

The client computer 10 is connected to a display 25 for displaying information to a user, such as a LCD display, a CRT display, or the like. The client computer 10 is also connected to a user input interface 30 for entering user commands to the client computer 10, which may include, but is not limited to, a keyboard, a mouse, a touch screen, a track ball, and the like.

Each FVS 20a-20c is a computer, e.g. a PC, including resources that are available to the client computer 10 via the network connection 17a-17c. The available resources on each FVS 20a-20c include at least one native application on the respective FVS 20a-20c that is capable of converting the format of a file unreadable by the client computer 10 into another format readable by the client computer 10. For example, the native application may be a version of Microsoft Word™ that can convert a Word file into an HTML file, which is readable by the web browser application on the client computer 10.

Each FVS 20a-20c is assigned a conversion rating for each file format unreadable by the client computer 10 that the respective FVS 20a-20c is capable of converting into another file format readable by the client computer 10. The conversion rating indicates the ability of the respective FVS 20a-20c to convert a particular file format unreadable by the client computer into another file format readable by the client computer 10. The conversion rating may depend on several factors including, but not limited to, the native application used by the respective FVS 20a-20c for converting the unreadable file format into a readable file format and/or the processing capabilities of the respective FVS 20a-20c. For example, a FVS 20a-20c running a later version of Microsoft Word may be assigned a higher conversion rating for converting Word files into HTML files than a FVS 20a-20c running an earlier version of Microsoft Word.

Figure 2:
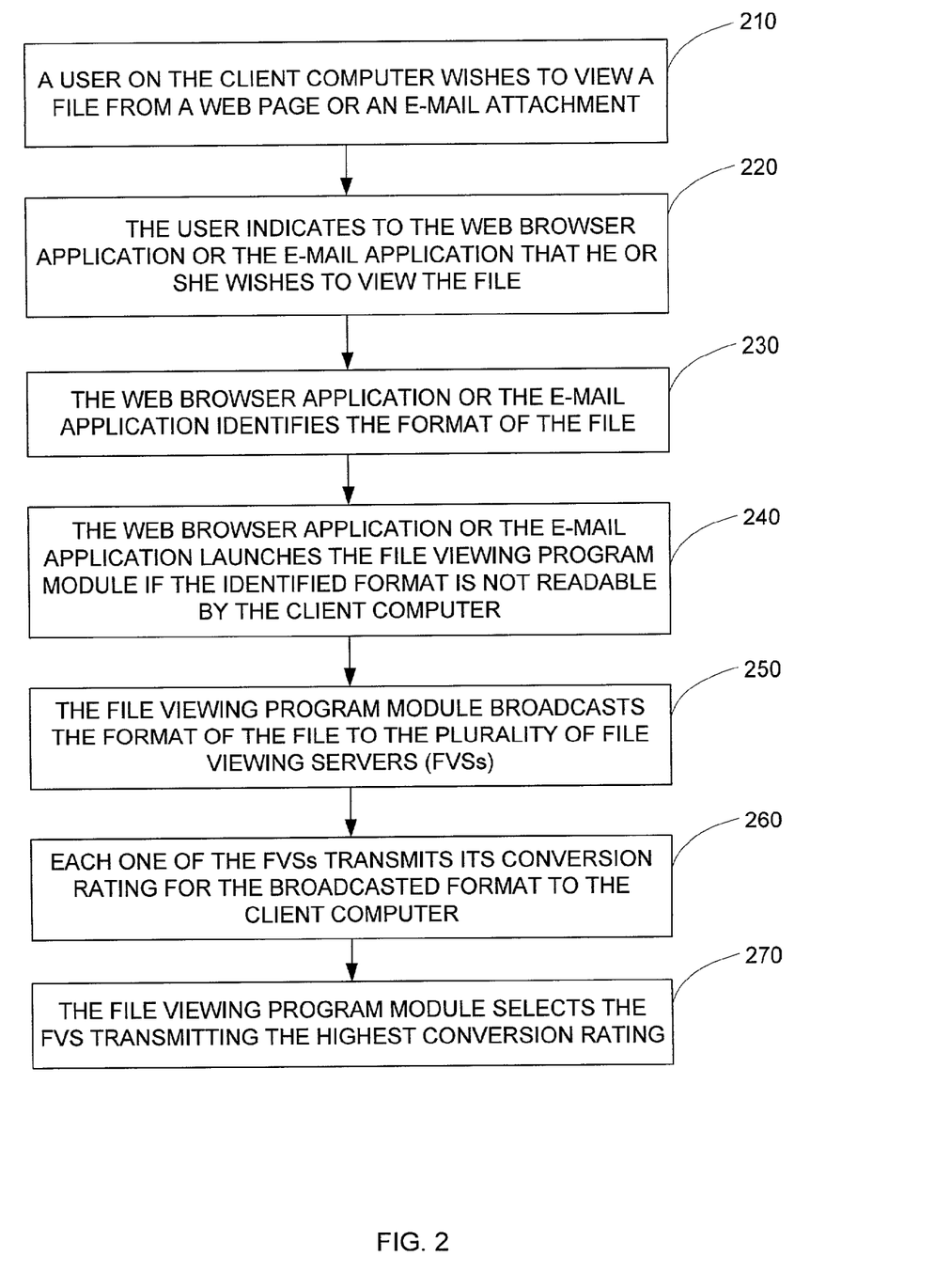
FIG. 2 is a flow chart of steps for selecting a file viewing server on the computer network.

Steps for selecting one of the FVSs 20a-20c to convert the format of a file received by the client computer 10 will now be described with reference to FIG. 2. In step 210, a user on the client computer 10 wishes to view a file from a web page or an e-mail attachment that is written in a format unreadable by the client computer 10. In other words, the file is written in a format that can not be read by a native application on the client computer 10. In step 220, the user indicates to the web browser application or the e-mail application on the client computer 10 that he or she wishes to view the file. For example, the user may select a link to the file with the user input interface 30, such as by double clicking on the link with a mouse.

In step 230, the web browser or the e-mail application identifies the format of the file. In step 240, the web browser or e-mail application launches the file viewing program module on the client computer 10 if the identified format is not readable by the client computer 10. The web browser application or the e-mail application may identify the format of the file by reading a Multipurpose Internet Mail Extension (MIME) attached to the file. The MIME is a standard identifier, typically a text string, identifying the format of a file. The web browser application or the e-mail application may include a table that links the MIME of a file with the file viewing program module so that the web browser application or the e-mail application can automatically launch the file viewing program module when it reads the MIME of the file. In step 250, the file viewing program module broadcasts the format of the received file to the plurality of FVSs 20a-20c via the computer network connections 17a-17c. The file viewing program module may also identify the format of the file by reading the MIME attached to the file.

In step 260, each FVS 20a-20c that is capable of converting the broadcasted file format unreadable by the client computer into another file format readable by the client computer 10 transmits its conversion rating for the broadcasted file format to the client computer 10. Preferably, each FVS 20a-20c transmits contact information along with its conversion rating to the client computer 10. The contact information may include, but is not limited to, a Uniform Resource Locator (URL) and/or an Internet Protocol (IP) address of the respective FVS 20a-20c. Upon receiving the conversion ratings from the FVSs 20a-20c, the file viewing program module selects the FVS 20a-20c transmitting the highest conversion rating in step 270. The file viewing program module may then contact the selected FVS 20a-20c using the contact information for the selected FVS 20a-20c to convert the format of the received file into another format readable by the client computer 10. Steps for carrying out the file conversion on the selected FVS 20a-20c will be discussed later.

In some cases, the FVSs 20a-20c may not know in advance which file format is readable by the client computer 10. In these cases, the client computer 10 may broadcast both the format of the received file and a conversion format to the FVSs 20a-20c, where the conversion format is a format readable by the client computer 10. In response, each FVS 20a-20c transmits its conversion rating corresponding to the format of the received file and the conversion format to the client computer 10.

In another embodiment of the present invention, the file viewing program module uses a FVS lookup table stored on the memory of the client computer 10 to determine which FVS 20a-20c is most suitable for converting the format of a received file unreadable by the client computer into another format readable by the client computer 10. In this embodiment, the FVS lookup table lists various file formats and a preferred FVS 20a-20c for each file format. The FVS lookup table may further list contact information for each listed FVS 20a-20c including, but not limited to, a URL and/or an IP address for the respective FVS 20a-20c.

When the user wishes to view a file written in a format that is not readable by the client computer 10, the file viewing program module searches for the format of the file in the FVS lookup table. If the file viewing program module is able to locate the format in the FVS lookup table, then the file viewing program module contacts the corresponding FVS 20a-20c in the FVS lookup table using the contact information provided by the FVS lookup table.

Figure 3:
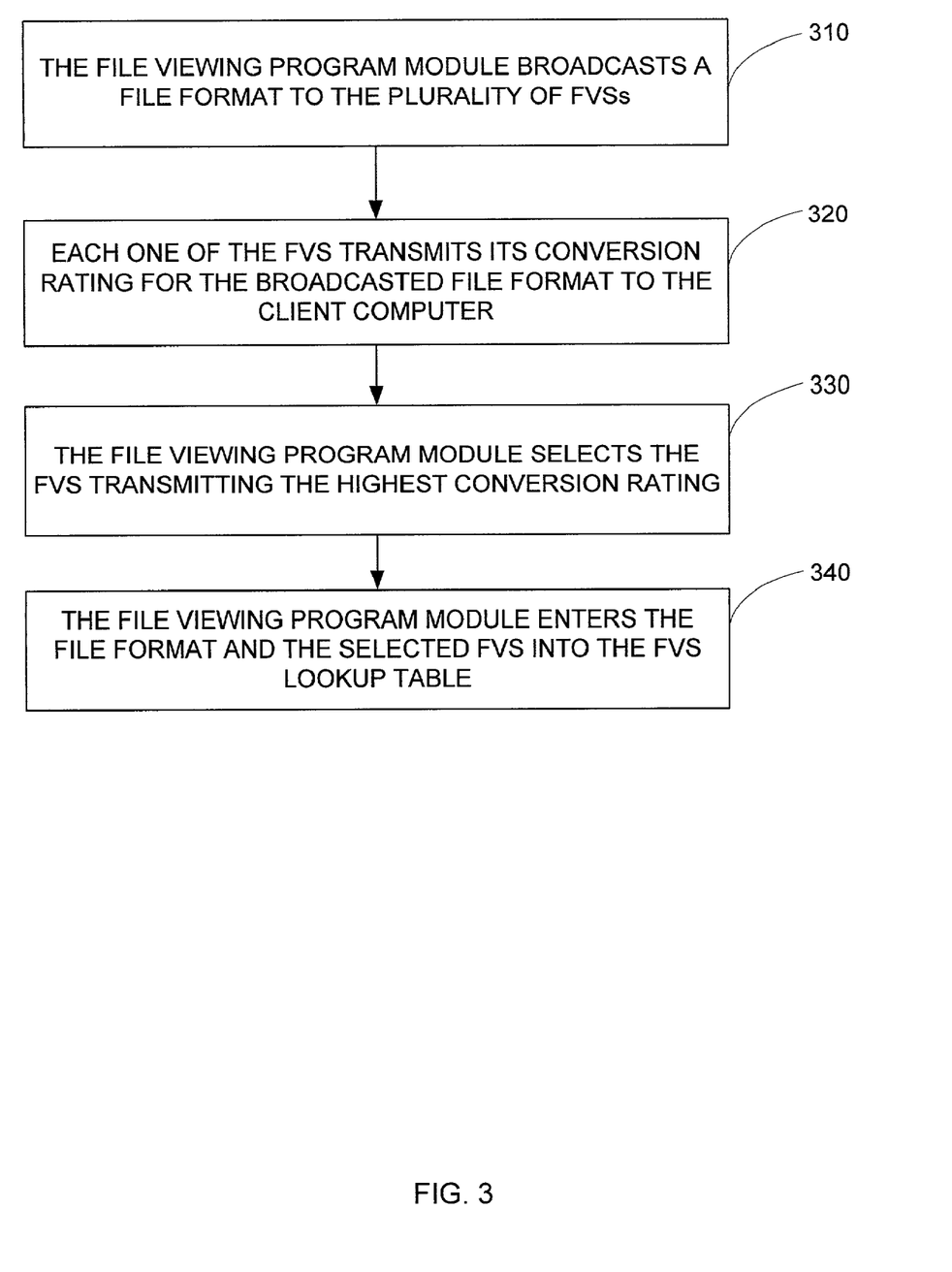
FIG. 3 is a flow chart of steps for writing an entry into a file viewing server table.

FIG. 3 shows exemplary steps for writing an entry into the FVS lookup table. The entry includes a file format unreadable by the client computer 10 and the FVS 20a-20c most suitable for converting the unreadable file format into another file format readable by the client computer 10. In step 310, the file viewing program module broadcasts the unreadable file format to the plurality of FVSs 20a-20c via the computer network connections 17a-17c. In step 320, each FVS 20a-20c capable of converting the broadcasted file format into another file format readable by the client computer 10 transmits its conversion rating for the broadcasted file format to the client computer 10. Upon receiving the conversion ratings from the FVSs 20a-20c, the file viewing program module selects the FVS 20a-20c transmitting the highest conversion rating in step 330. In step 340, the file viewing program module enters the file format and the selected FVS 20a-20c into the FVS lookup table. The file viewing program module may repeat steps 310 through 340 for each one of several different file formats, so that each file format and the corresponding selected FVS 20a-20c is entered into the FVS lookup table.

The FVS lookup table may include more than one FVS 20a-20c for a file format. For example, the FVS lookup table may also include the FVS 20a-20c having the second highest conversion rating for a file format in case the FVS 20a-20c having the highest conversion rating for the file format is disconnected from the computer network 5 or otherwise becomes unavailable.

Figure 4:
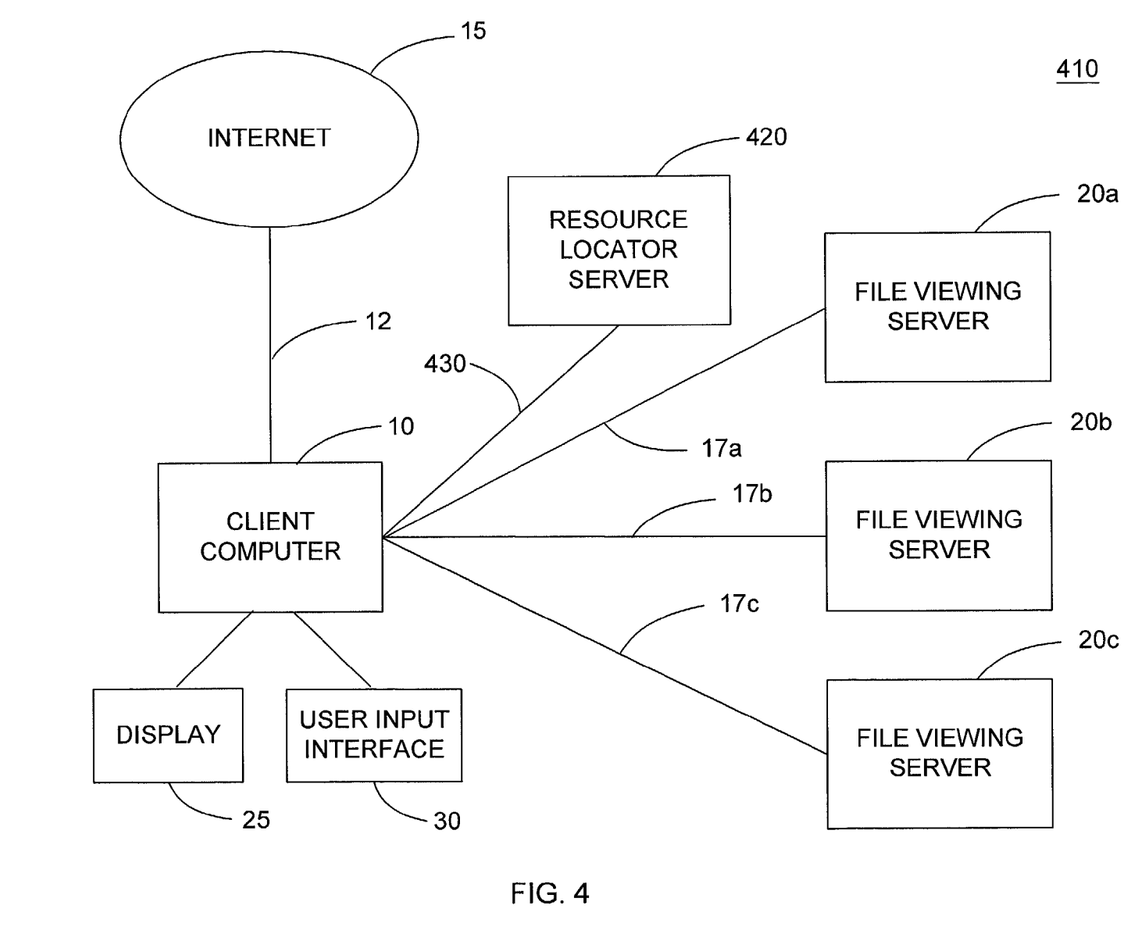
FIG. 4 is a block diagram of an exemplary computer network according to another embodiment of the present invention.

FIG. 4 shows a computer network 410 according to another embodiment of the invention. The computer network 410 includes a resource locator server 420, which is connectable to the client computer 10 via a network connection 430 and the FVSs 20a-20c via network connections (not shown). In this embodiment, when the user wishes to view a file written in a format unreadable by the client computer 10, the file viewing program module on the client computer 10 transmits the format of the file to the resource locator server 420. Upon receiving the format from the client computer 10, the resource locator server 420 selects the FVS 20a-20c that is most suitable for converting the received format into another format readable by the client computer 10. The resource locator server 420 transmits the selected FVS 20a-20c, along with contact information for the selected FVS 20a-20c, to the client computer 10. The contact information may include, but is not limited to, a URL and/or an IP address of the selected FVS 20a-20c. The file viewing program module then contacts the FVS 20a-20c selected by the resource locator server 420 to convert the format of the received file into another format readable by the client computer 10.

The resource locator server 420 may select the FVS 20a-20c for a received format by following steps 250-270 described above. In this case, the resource locator server 420 broadcasts the received format to the plurality of FVSs 20a-20c. In response, each FVS 20a-20c transmits its conversion rating for the broadcasted format to the resource locator server 420. The resource locator server 420 then selects the FVS 20a-20c transmitting the highest conversion rating. In addition to using the conversion ratings in selecting a FVS 20a-20c, the resource locator server 420 may consider other factors in selecting the FVS 20a-20c. For example, the resource locator server 420 may keep track of the current workloads of the FVSs 20a-20c and give preference to a FVS 20a-20c having a smaller workload over a FVS 20a-20c having a larger workload. This will tend to balance the workload among the FVSs 20a-20c on the computer network 410.

Alternatively, the resource locator server 420 may use a FVS lookup table to select the FVS 20a-20c. The resource locator server 420 may write entries for various file formats into its FVS lookup table by following steps 310-340 described above for each file format. In addition, the resource locator server 420 may update the entries in its FVS lookup table each time one or more FVSs 20a-20c are added to or taken away from the computer network 410.

Figure 5:
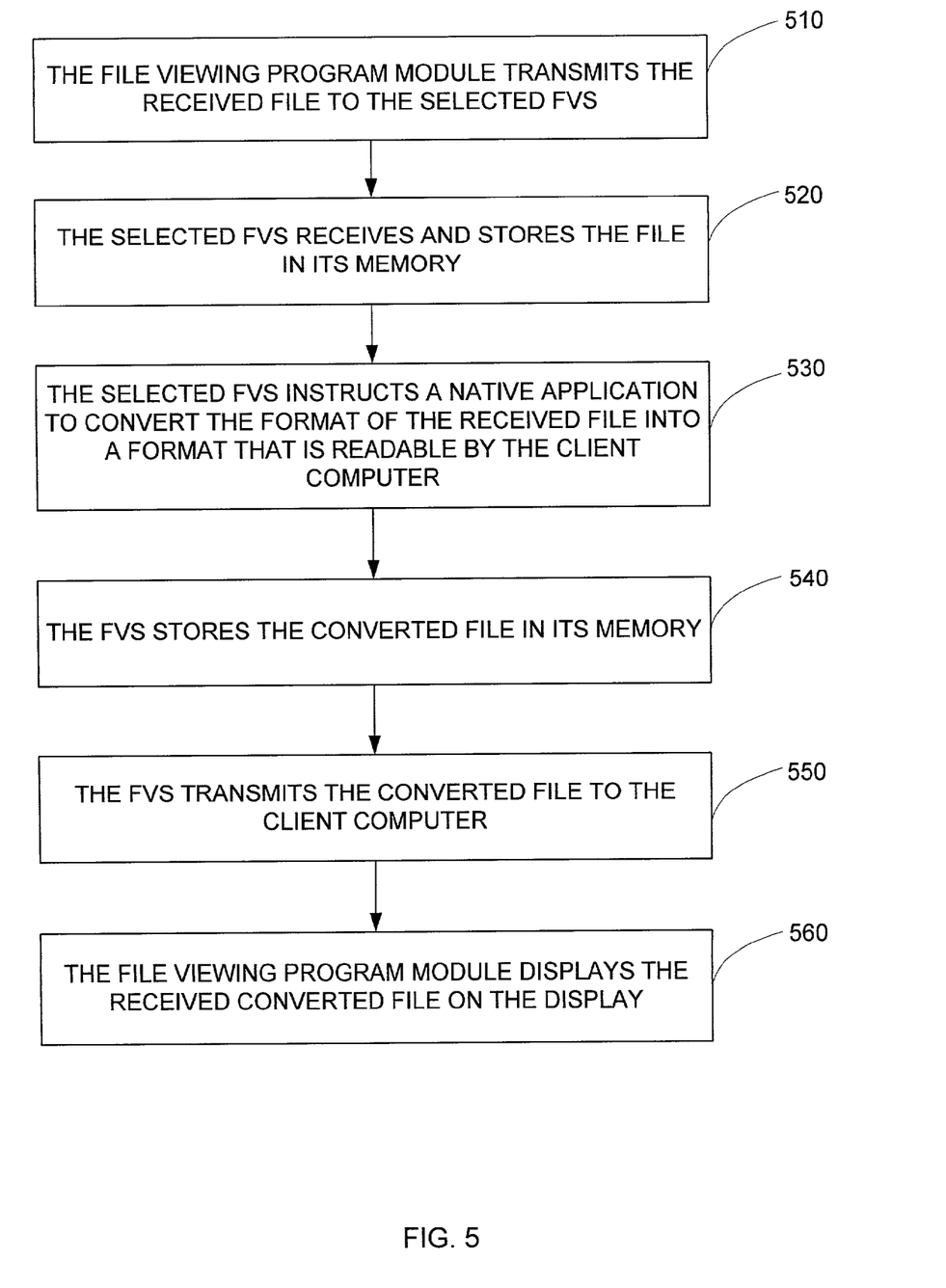
FIG. 5 is a flow chart of steps for converting the format of a file using the computer network.

Steps for contacting the selected FVS 20a-20c to convert a file written in a format unreadable by the client computer 10 will now be described with reference to FIG. 5. In step 510, the file viewing program module transmits the received file to the selected FVS 20a-20c via the network connection 17a-17c. In step 520, the selected FVS 20a-20c receives the file and stores the file locally in its memory. In step 530, the selected FVS 20a-20c instructs a native application to convert the format of the received file into another format readable by the client computer 10. In step 540, the FVS 20a-20c stores the converted file in its memory. For example, the selected FVS 20a-20c may convert a Word file into an HTML file by instructing a version of Microsoft Word™ to open and then save the Word file as an HTML file to a specified location in the FVS's 20a-20c memory.

In step 550, the FVS 20a-20c transmits the converted file to the client computer 10 via the network connection 17a-17c. In step 560, the file viewing program module displays the received converted file on the display 25 using a native application on the client computer 10. Alternately, in step 550, the FVS 20a-20c may transmit the location of the converted file in its memory to the client computer 10. The location may be transmitted to the client computer 10 in the form of a URL and/or an IP address. In step 560, the file viewing program module directs the web browser application on the client computer 10 to the location of the converted file on the FVS 20a-20c so that the web browser application can download and display the converted file to the user.

An advantage of the present invention is that it enables a Linux based client computer 10 to view a Windows based file, such as a Word, Power Point, Visio, BMP, Excel, and the like file. This is accomplished by having the file viewing program module transmit the Windows based file to a Windows based FVS 20a-20c to convert the received Windows based file into an HTML file, which is readable by the web browser application on the client computer 10.

In another embodiment, any one of the computer networks 5, 410 may include a terminal emulator, such as Citrix and Virtual Network Computing (VNC). The terminal emulator enables applications running on one of the FVSs 20a-20c to be displayed on the client computer 10. The terminal emulator includes a server application on the respective FVSs 20a-20c and a viewer application on the client computer 10. The server application on the respective FVS 20a-20c converts an application running on the FVS 20a-20c into display content information, which is transmitted to the client computer 10 via the network connection 17a-17c. The viewer application on the client computer 10 uses the received display content information to display the application running on the FVS 20a-20c in a terminal window on the display 25 of the client computer 10. Many commercially available terminal emulators, such as VNC, allow the server application and the viewer application to run on different operating systems and/or computer architectures.

Figure 6:
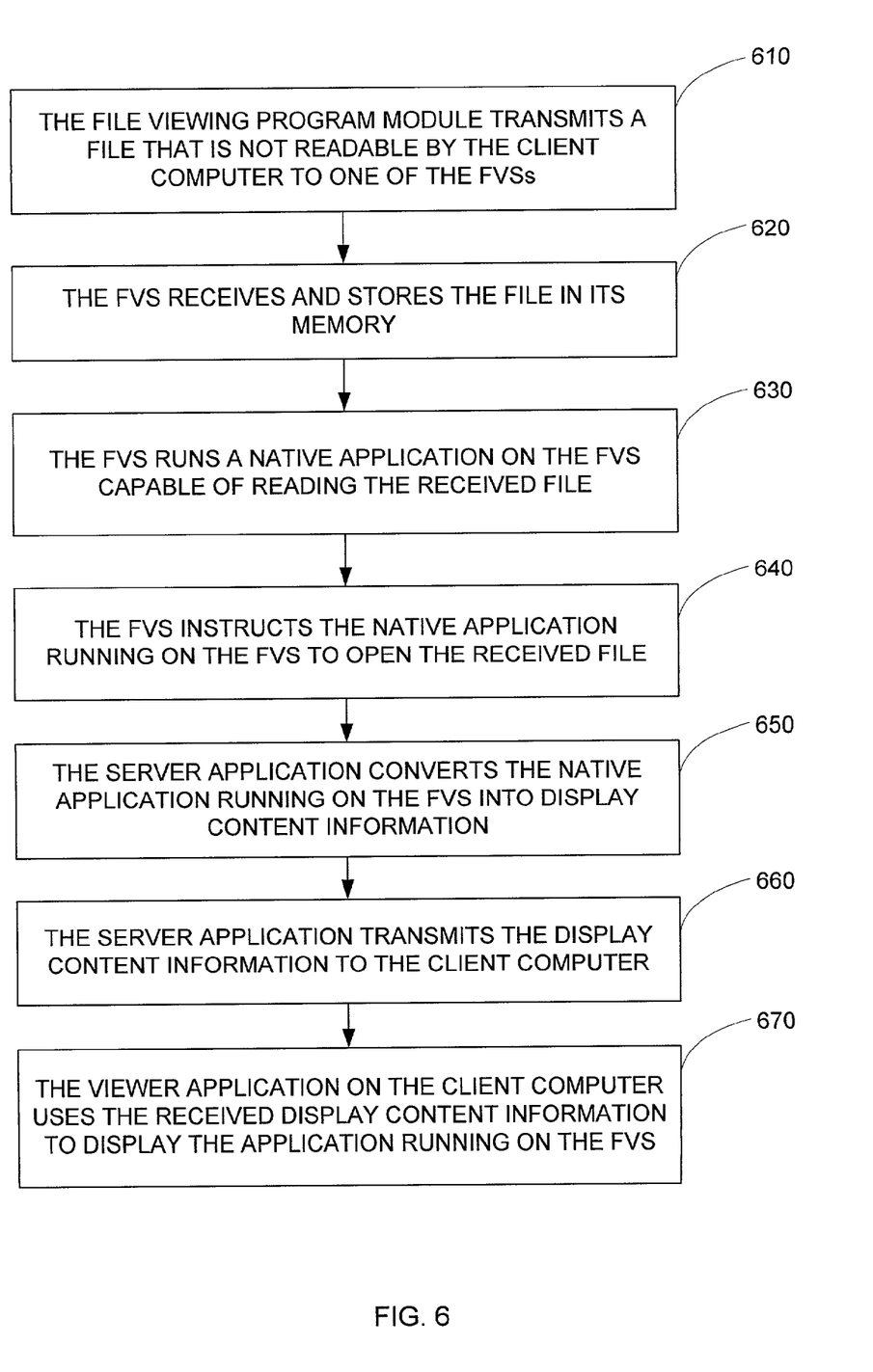
FIG. 6 is a flow chart of steps for viewing a file on the computer network using a terminal emulator.

Steps for viewing a file on the computer network using the terminal emulator will now be described with reference to FIG. 6. In step 610, the file viewing program module on the client computer 10 transmits the received file to one of the FVSs 20a-20c via the network connection 17a-17c. In step 620, the FVS 20a-20c receives and stores the file in its memory. In step 630, the FVS 20a-20c loads and runs a native application on the FVS 20a-20c, which is capable of reading the received file. In step 640, the FVS 20a-20c instructs the native application running on the FVS 20a-20c to open the received file. For example, the FVS 20a-20c may instruct Microsoft Word to open a Word file. In step 650, the server application on the FVS 20a-20c converts the application running on the FVS 20a-20c into display content information. In step 660, the server application transmits the display content information to the client computer 10 via the network connection 17a-17c. In step 670, the viewer application on the client computer 10 uses the received display content information to display the application running on the FVS 20a-20c in a terminal window on the display 25 of the client computer 10. This enables the user on the client computer 10 to view the file, which is opened using the application running on the FVS 20a-20c.

The conversion of the format of a file into another format may also include decrypting an encrypted file or decompressing a compressed file, such as a ZIP file. This may be useful in cases where the client computer 10 does not have a native application capable of decrypting an encrypted file or decompressing a compressed file. In these cases, the file viewing program module may transmit an encrypted or compressed file to the one of the FVSs 20a-20c. Upon receiving the file, the respective FVS 20a-20c decrypts or decompresses the file and stores the decrypted or decompressed file in its memory. The FVS 20c may then make the decrypted or decompressed file available to the client computer 10 by transmitting the decrypted or decompressed file to the client computer 10 or transmitting the location of the decrypted or decompressed file in the FVS's 20a-20c memory to the client computer 10. For cases in which the decrypted or decompressed file is written in a format that is still not readable by the client computer 10, the FVS 20a-20c may further convert the format of the decrypted or decompressed file into another format that is readable by the client computer 10.

In another embodiment, the file viewing program module on the client computer 10 may transmit a compressed file archive containing several files to the selected FVSs 20a-20c. In this embodiment, the respective FVS 20a-20c decompresses the received file archive and stores the decompressed file archive in its memory. The FVS 20a-20c generates an HTML index page listing each decompressed file contained in the decompressed file archive along with a link to each decompressed file, and stores the HTML index page in the FVS's 20a-20c memory. The FVS 20a-20c then transmits the HTML index page to the client computer 10, and the file viewing program module displays the HTML index page to the user using the web browser application on the client computer 10. Alternatively, the FVS 20a-20c transmits a location, e.g. a URL, of the HTML index page to the client computer 10, and the file viewing program module then directs the web browser application on the client computer 10 to the location of the HTML index page so that the web browser can download and display the HTML index page to the user. From the HTML index page, the user can view any one of the decompressed files listed in the HTML index page by clicking onto the file's link on the HTML index page. This embodiment may be especially useful in cases where the client computer 10 lacks enough available memory space to store the entire decompressed file archive at one time.

In a further embodiment, the selected FVS 20a-20c may download a file archive from the Internet 15 and decompress the file archive on behalf of the user on the client computer 10. In this embodiment, the user may click onto the link to a file archive on a web page that he or she wishes to view. The file viewing program module then transmits the URL of the file archive to the selected FVS 20a-20c along with a request to download and decompress the file archive. The selected FVS 20a-20c uses the received URL to locate the file archive on the Internet 15. After locating the file archive on the Internet 15, the FVS 20a-20c downloads and decompresses the file archive and stores the decompressed file archive in its memory. The FVS 20a-20c may then make the decompressed file archive available to the user on the client computer 10 using the HTML index page according to the previous embodiment.

Those skilled in the art will appreciate that various modifications may be made to the just described preferred embodiments without departing from the spirit and scope of the invention. For example, those skilled in the art will appreciate that the source code of the file viewing program module can be integrated into the web browser application on the client computer 10. Therefore, the invention is not to be restricted or limited except in accordance with the following claims and their legal equivalents.

What is claimed is:

1. In a computer network comprising a client computer and a plurality of servers, wherein each server is capable of being assigned at least one conversion rating, each conversion rating corresponding to a processing capability of each server to convert a first file format unreadable by the client computer that the respective server is capable of converting into a second file format readable by the client computer, wherein the conversion rating depends on the native application used by the respective server or the processing capabilities of the respective server, a method for selecting one of the plurality of servers comprising:

receiving a file on the client computer, wherein the file is written in a source format unreadable by the client computer;

broadcasting the format of the received file to the plurality of servers;

in response to the broadcast, receiving from at least one of the plurality of servers the conversion rating assigned thereto corresponding to the broadcasted format of the received file;

selecting one of the plurality of servers having the highest conversion rating assigned thereto corresponding to the source format of the received file;

transmitting to the selected server the received file written in the source format unreadable by the client computer;

receiving from the selected server a location of the received file written in a conversion format readable by the client computer, wherein the received file written in the source format is converted by the selected server into the received file written in the conversion format;

directing a web browser application on the client computer to the location of the received file written in the conversion format on the selected server; and downloading the received file written in the conversion format from the selected server onto the client computer using the web browser application.

2. The method of claim 1, further comprising: selecting a conversion format for the received file, wherein the conversion format is readable by the client computer, and further wherein the selected server is capable of converting the received file written in the source format into the received file written in the conversion format.

3. The method of claim 1, further comprising: reading a Multipurpose Internet Mail Extension (MIME) attached to the received file to identify the source format of the received file.

4. The method of claim 1, wherein the step of selecting one of the plurality of servers further comprises:

broadcasting the source format of the received file to the plurality of servers;

in response to the broadcast, receiving from at least one of the plurality of servers the conversion rating assigned thereto corresponding to the source format of the received file; and selecting one of the plurality of servers having the highest received conversion rating.

5. The method of claim 1, wherein the client computer comprises a lockup table having one or more entries, each entry including a file format unreadable by the client computer and a preferred one of the plurality of servers capable of converting the unreadable file format into a file format readable by the client computer, and wherein the step of selecting one of the plurality of servers further comprises:

locating the entry in the lookup table corresponding to the source format of the received file; and selecting the preferred one of the plurality of servers Included in the located entry of the lockup table.

6. The method of claim 1, wherein the client computer and the selected server utilize different operating systems.

7. The method of claim 1, further comprising:

transmitting to the selected server the received file written in the source format unreadable by the client computer;

receiving from the selected server the received file written in a conversion format readable by the client computer, wherein the received file written in the source format is converted by the selected server into the received file written in the conversion format; and displaying the received file written in the conversion format on the client computer using a native application on the client computer.

8. The method of claim 7, wherein the conversion format for the received file is Hyper Text Markup Language (HTML) format, and the native application on the client computer is a web browser application.

9. The method of claim 7, wherein the source format of the received file is compressed format, and the conversion format for the received file is decompressed format.

10. The method of claim 9, wherein the source format of the received tile is ZIP format.

11. The method of claim 7, wherein the source format of the received file is encrypted format, and the conversion format for the received file is decrypted format.

12. The method of claim 1, wherein the location of the received rile written in the conversion format is one of: a Uniform Resource Locator (URL) and an Internet Protocol (IP) address.

13. The method of claim 1, wherein the conversion format for the received file is hyper Text Markup Language (HTML) format.

14. The method of claim 1, wherein the source format of the received file is compressed format, and the conversion format for the received file is decompressed format.

15. The method of claim 1, wherein the source format of the received file is encrypted format, and the conversion format for the received file is decrypted format.

16. The method of claim 1, further comprising:

transmitting to the selected server the received file written in the source format unreadable by the client computer;

receiving from the selected server display content information, wherein the received file is opened in an application running on the selected server and the display content information is generated therefrom; and displaying the display content information on the client computer.

17. The method of claim 1, wherein the received file is a file archive including a plurality of files written in a compressed format unreadable by the client computer, further comprising:

transmitting to the selected server the file archive written in the compressed format;

receiving from the selected server an index page including a plurality of links, each link corresponding to one of the plurality of files in the file archive written in a decompressed format readable by the client computer, wherein the file archive written in the compressed format is converted by the selected server into the file archive written in the decompressed format; and displaying the index page on the client computer.

18. The method of claim 1, wherein the step of receiving includes recognizing by rho client computer that the client computer is unable to read the file due to the source format of the file.

19. The method of claim 1, further comprising failing to road the file by the client computer because the source format of the file is unreadable by the client computer.

20. The method of claim 1, wherein a file is written in source format unreadable by the client computer when the format of the file needs to be converted into a different format from the source format in order to be readable by the client computer.

21. The method of claim 1, wherein a file is written in a source format unreadable by the client computer when an entirety of the file is unreadable by the client computer in the source format.

22. A storage medium readable by a client computer and having instructions encoded thereon for causing the client computer to perform, in a computer network comprising the client computer and a plurality of servers, wherein each server is capable of being assigned at least one conversion rating, each conversion rating corresponding to a processing capability of each server to convert a first file format unreadable by the client computer that the respective server is capable of converting into a second file format readable by the client computer, wherein the conversion rating depends on the native application used by the respecting server or the processing capabilities of the respective server, a method for selecting one of the plurality of servers, the method comprising the steps of:
   receiving a file on the client computer, wherein the file is written in a source format unreadable by the client computer;
   selecting one of the plurality of servers having the highest conversion rating assigned thereto corresponding to the source format of the received file;
   wherein the step of selecting one of the plurality of servers further comprises:
      broadcasting the source format of the received file to the plurality of servers;
      in response to the broadcast, receiving from at least one of the plurality of servers the conversion rating assigned thereto corresponding to the source format of the received file; and
      selecting one of the plurality of servers having the highest received conversion rating.

23. The storage medium of claim 22, wherein the client computer comprises a lockup table having one or more entries, each entry including a file format unreadable by the client computer and a preferred one of the plurality of servers capable of converting the unreadable file format into a file format readable by the client computer, and wherein the step of selecting one of the plurality of servers further comprises:
   locating the entry in the lookup table corresponding to the source format of the received file; and
   selecting the preferred one of the plurality of servers included in the located entry of the lookup table.

24. In computer network comprising a client computer and a plurality of servers, wherein each server is capable of being assigned at least one conversion rating, each conversion rating corresponding to a processing capability of each server to convert a first file format unreadable by the client computer that the respective server is capable of converting into a second file format readable by the client computer, wherein the conversion rating depends on the native application used by the respective server or the processing capabilities of the respective server, the client computer comprising:
   a processor:
   a memory;
   equipment for coupling to the network, wherein the client computer is capable of intermittently connecting to at least one of the plurality of servers through the network; and
   a computer program stored on the memory and capable of being executed by the processor, wherein the program is capable of performing the steps of:
      receiving a file on the client computer, wherein the file is written in a source format unreadable by the client computer; and
      selecting one of the plurality of servers having the highest conversion rating assigned thereto corresponding to the source format or the received file;
      wherein the step of selecting one of the plurality of servers further comprises;
         broadcasting the source format of the received file to the plurality of servers:
         in response to the broadcast, receiving from at least one of the plurality of servers the conversion rating assigned thereto corresponding to the source format of the received file; and
         selecting one of the plurality of servers having the highest received conversion rating.

25. The client computer of claim 24, further comprising: a lookup table stored on the memory and having one or more entries, each entry including a file format unreadable by the client computer and a preferred one of the plurality of servers capable of converting the unreadable file format into a file format readable by the client computer, wherein the step of selecting one of the plurality of servers further comprises:
   locating the entry in the lookup table corresponding to the source format of the received file; and
   selecting the server included in the located entry of the look up table.

26. In a computer network comprising a client computer and a plurality of servers, wherein each server is capable of being assigned at least one conversion rating, each conversion rating corresponding to a processing capability of each server to convert a first file format unreadable by the client computer that the respective server is capable of converting into a second file format readable by the client computer, wherein the conversion rating depends on the native application used by the respective server or the processing capabilities of the respective server, a method for selecting one of the plurality of servers comprising:
   receiving a file on the client computer, wherein the file is written in a formal unreadable by the client computer;
   broadcasting the format of the received file;
   in response to the transmission of the format of the received file, receiving a selection of one of the plurality of servers from a resource locator server, wherein the selected server has the highest conversion rating assigned thereto corresponding to the format of the received file.

27. The method of claim 26, further comprising reading a Multipurpose Internet Mail Extension (MIME) attached to the received file to identify the format of the received file.

28. The method of claim 26, further comprising receiving contact information for the selected server from the resource locator server.

29. The method of claim 28, wherein the contact information for the selected server comprises one of: a Uniform Resource Locator (URL) and an Internet Protocol (IP) address.

30. The method of claim 26 wherein the client computer operates using a Linux operating system and the unreadable file format is based upon a Microsoft Windows operating system.

31. The method of claim 26 wherein the unreadable source format of the received file is a file format that is formatted for use on a computer utilizing operating system software different from operating system software installed on the client computer.

32. The method of claim 26 wherein the unreadable source format of the received file is a type of format that the client computer cannot present to a user of the client computer using a program present on the client computer.

33. The method of claim 26 wherein the unreadable source format of the received file is a file format readable by an operating system software that is not installed on the client computer.

34. In a computer network comprising a client computer and a plurality of servers, wherein each server is capable of being assigned at least one conversion rating, each conversion rating corresponding to a processing capability of each server to convert a first file format unreadable by the client computer that the respective server is capable of converting into a second file format readable by the client computer, wherein the conversion rating depends on the native application used by the respective server or the processing capabilities of the respective server, a method for displaying a file archive located on the Internet, wherein the file archive includes a plurality of files and is written in a source format unreadable by the client computer, comprising:

receiving a file on the client computer, wherein the file is written in a source format unreadable by the client computer;

broadcasting the format of the received file to the plurality of servers;

in response to the broadcast, receiving from at least one of the plurality of servers the conversion rating assigned thereto corresponding to the broadcasted format of the received file;

selecting one of the plurality of servers having the highest conversion rating assigned thereto corresponding to the source format of the file archive;

transmitting a location of the file archive on the Internet to the selected server;

receiving from the selected server an index page including a plurality of links, each link corresponding to one of the plurality of files in the rile archive written in a conversion format readable by the client computer, wherein the file archive written in the source format is converted by the selected server into the file archive, written in the conversion format; and displaying the index page on the client computer.

35. The method of claim 34, wherein the source format of the file archive is compressed format, and the conversion format of the file archive is decompressed format.

36. The method of claim 34, wherein the index page is written in Hyper Text Markup Language (HTML) and displayed on the client computer using a web browser application.

37. The method of claim 34, wherein the location of the file archive on the Internet is one of: a Uniform Resource Locator (URL) and an Internet Protocol (IP) address.

38. In a computer network comprising a client computer and a plurality of servers, wherein each server is capable of being assigned at least one conversion rating, each conversion rating corresponding to a processing capability of each server to convert a first file format unreadable by the client computer that the respective server is capable of converting into a second file format readable by the client computer, wherein the conversion rating depends on the native application used by the respective server or the processing capabilities of the respective server, a method for selecting one of the plurality of servers comprising:

receiving a file on the client computer, wherein the received file is written in a format unreadable by the client computer;

broadcasting the format of the received file to the plurality of servers;

in response to the broadcast, receiving from at least one of the plurality of servers the conversion rating assigned thereto corresponding to the broadcasted format of the received file; and selecting one of the plurality of servers having the highest received conversion rating;

wherein the client computer operates using a Linux operating system and the unreadable file format is based upon a Microsoft Windows operating system.

39. The method of claim 38, further comprising:

transmitting to the selected server the received file written In the format unreadable by the client computer;

receiving from the selected server the received file written in a conversion format readable by the client computer, wherein the received file written in the source format is converted by the selected server into the received file written in the conversion format; and displaying the received file written in the conversion format on the client computer using a native application on the client computer.

40. The method of claim 38, further comprising:

transmitting to the selected server the received file written in the source format unreadable by the client computer; and receiving from the selected server a location of the received file written in a conversion format readable by the client computer, wherein the received file written in the source format is converted by the selected server into the received file written in the conversion format.

41. The method of claim 38, further comprising:

transmitting to the selected server the received file written in the source format unreadable by the client computer;

receiving from the selected server display content information, wherein the received file is opened in an application running on the selected server and the display content information is generated therefrom; and displaying the display content information on the client computer.

42. The method of claim 38, wherein the received file is a file archive including a plurality of file, written in a compressed format unreadable by the client computer, further comprising:

transmitting to the selected server the file archive written in the compressed format;

receiving from the selected server an index page including a plurality of links, each link corresponding to one of the plurality of files in the file archive written in a decompressed format readable by the client computer, wherein the file archive written in the compressed format is converted by the selected server into the file archive written in the decompressed format; and displaying the index page on the client computer.

43. A storage medium readable by a client computer and having instructions encoded thereon for causing the client computer to perform, in a computer network comprising the client computer and a plurality of servers, wherein each server is capable of being assigned at least one conversion rating, each conversion rating corresponding to a processing capability of each server to convert a first file format unreadable by the client computer that the respective server is capable of converting into a second file format readable by the client computer, wherein the conversion rating depends on the native application used by the respective server or the processing capabilities of the respective server, a method for selecting one of the plurality of servers, the method comprising the steps of:

receiving a file on the client computer, wherein the received file is written in a format unreadable by the client computer;

broadcasting the format of the received file to the plurality of servers;

in response to the broadcast, receiving from at least one of the plurality of servers the conversion rating assigned thereto corresponding to the broadcasted format of the received file; and     selecting one of the plurality of servers having the highest received conversion rating.

44. In a computer network comprising a client computer and a plurality of servers, wherein each server is capable of being assigned at least one conversion rating, each conversion rating corresponding to a processing capability of each server to convert a first file format unreadable by the client computer that the respective server is capable of converting into a second file formal readable by the client computer, wherein the conversion rating depends on the native application used by the respective server or the processing capabilities of the respective server, the client computer comprising:

a processor;

a memory;

equipment for coupling to the network, wherein the client computer is capable of intermittently connecting to at least one of the plurality of servers through the network; and     a computer program stored on the memory and capable of being executed by the processor, wherein the program is capable of performing the steps of:

receiving a file on the client computer, wherein the received file is written in a format unreadable by the client computer;

broadcasting the format of the received file to the plurality of servers;

in response to the broadcast, receiving from at least one of the plurality of servers the conversion rating assigned thereto corresponding to the broadcasted format of the received file; and     selecting one of the plurality of servers having the highest received conversion rating.

\* \* \* \* \*